United States Patent
Korol

(10) Patent No.: US 7,120,400 B2
(45) Date of Patent: Oct. 10, 2006

(54) METHOD AND APPARATUS TO CONTROL POWER OF TRANSMITTER

(75) Inventor: Victor Korol, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 10/314,173

(22) Filed: Dec. 9, 2002

(65) Prior Publication Data

US 2004/0110475 A1 Jun. 10, 2004

(51) Int. Cl.
*H04Q 11/12* (2006.01)
*H04B 1/04* (2006.01)

(52) U.S. Cl. .................... 455/126; 455/127.2
(58) Field of Classification Search ........... 455/126, 455/127.1, 127.2, 127.3, 127.5, 522, 69; 375/295, 297; 330/278, 284, 291
See application file for complete search history.

(56) References Cited

U.S. PATENT DOCUMENTS

| | | | | |
|---|---|---|---|---|
| 4,066,965 A | * | 1/1978 | Schultz et al. | 375/295 |
| 5,307,512 A | * | 4/1994 | Mitzlaff | 455/126 |
| 5,507,017 A | * | 4/1996 | Whitmarsh et al. | 455/126 |
| 5,751,763 A | * | 5/1998 | Bruckert | 375/141 |
| 6,038,428 A | * | 3/2000 | Mizusawa et al. | 455/69 |
| 6,118,988 A | * | 9/2000 | Choi | 455/115.1 |
| 6,178,193 B1 | * | 1/2001 | Kondo | 375/130 |
| 6,304,749 B1 | * | 10/2001 | Obara | 455/126 |
| 6,385,184 B1 | * | 5/2002 | Kitade et al. | 370/337 |
| 6,519,293 B1 | * | 2/2003 | Miyake | 375/297 |

* cited by examiner

*Primary Examiner*—Nguyen T. Vo
(74) *Attorney, Agent, or Firm*—Pearl Cohen Zedek Latzer LLP

(57) ABSTRACT

Briefly, a method an apparatus to control a power of a transmitter during received slot duration is provided. A power control module set the transmitter to transmit in a targeted power level base on a command received from the slot. The power control module may set an input signal to a first level and may gradually vary the level of the input signal to be substantially equal to its original level and to adjust a gain of the transmitter to transmit at the targeted power level.

19 Claims, 2 Drawing Sheets

METHOD AND APPARATUS TO CONTROL POWER OF TRANSMITTER

BACKGROUND OF THE INVENTION

In some wireless communication systems, for example, cellular communication systems, a power control module may be used to control the power of a transmitted signal. For example, in a Wideband Code Division Multiple Access (WCDMA) cellular system, a mobile station (MS) may be able to transmit radio frequency (RF) signals with a wide power range, for example, a 75 dB. Thus, a power control module at the MS may control the power of the transmitted signal over the power range of 75 dB with an accuracy of, for example, ±0.5 dB for a 1 dB power step.

In order to meet the requirements of WCDMA standards, calibration of the MS transmitter may be needed. The calibration of the MS transmitter may be performed at the MS manufacturer's production line and may consume large resources. Furthermore, many calibration steps, e.g., 75 steps in the example above, may be required to calibrate the MS transmitter, and the calibration parameters of the calibration steps may be stored at the MS memory.

Thus, there is a need for improved transmitter calibration, which mitigates the above-described disadvantages.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
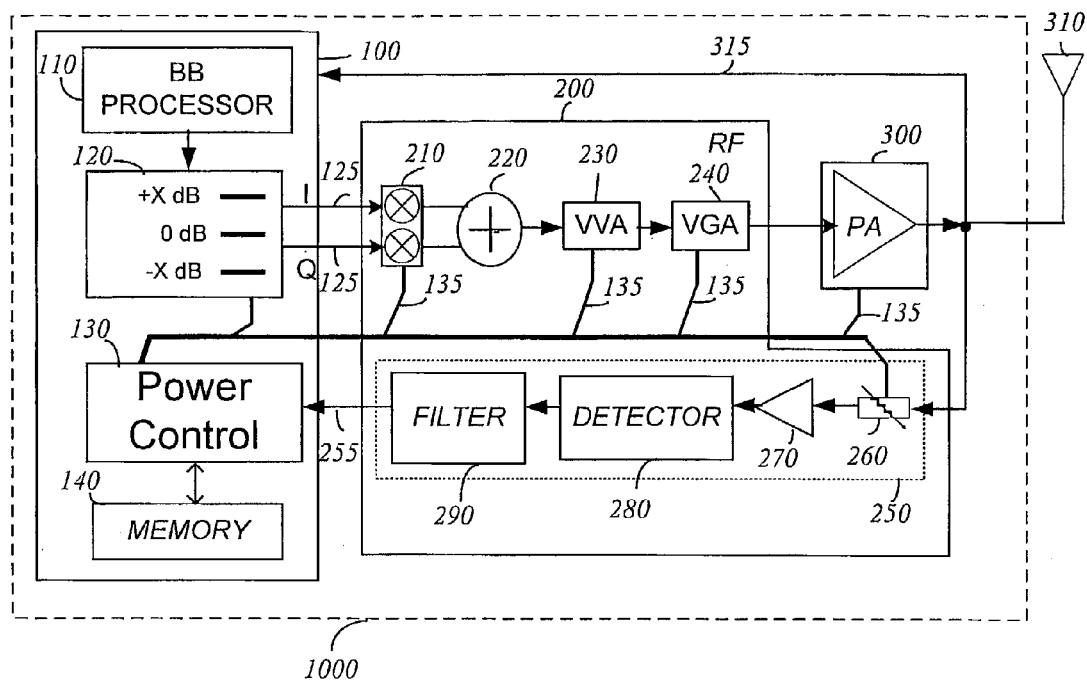
FIG. 1 is a schematic illustration of a mobile station according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

It should be understood that the present invention may be used in a variety of applications. Although the present invention is not limited in this respect, the circuits and techniques disclosed herein may be used in many apparatuses such as transmitters of a radio system. Transmitters intended to be included within the scope of the present invention include, by a way of example only, cellular radiotelephone transmitters, two-way radio transmitters, digital system transmitters, wireless local area network transmitters, wideband transmitters, ultra wideband transmitters, and a like, Type of cellular radiotelephone transmitters intended to be within the scope of the present invention include, although not limited to, Code Division Multiple Access (CDMA), CDMA-2000 and wide band CDMA (WCDMA) cellular radiotelephone transmitters for receiving spread spectrum signals, transmitters for global system for mobile communication (GSM), transmitters for third generation cellular systems (3G) and the like.

Turning first to FIG. 1, a block diagram of a mobile station (MS) 1000 in accordance with the invention is shown. Although the scope of the present invention is not limited to this example, MS 1000 may include a baseband portion 100, a transmitter 200, a power amplifier 300 and an antenna 310 for example, a dipole antenna and the like.

Although the scope of the present invention is not limited in this respect, baseband portion 100 may include a baseband processor 110, a step attenuator 120, a power control module 130 and a memory 140. Transmitter 200 may include a mixer 210, a combiner 220, a feedback path 250, and controllable circuitry such as, for example, a variable voltage attenuator (VVA) 230 and a variable gain amplifier (VGA) 240. For example, in this embodiment, feedback path 250 may include a step attenuator 260, an amplifier 270, a detector 280 and a filter 290.

Although the scope of the present invention is not limited in this respect, baseband processor 110, which may include, for example, a baseband processor such as that used in MS's of CDMA, CDMA 2000, WCDMA and like systems, may receive from antenna 310 a received signal 315. For example, in WCDMA cellular communication systems, received signal 315 may include data represented by a stream of information bits or chips, as are known to persons skilled in the art. The chips may be arranged in radio frames. The length of a radio frame may be equal to 38400 chips, which may include 15 slots of 2560 chips, if desired.

Although the scope of the present invention is not limited in this respect, for simplicity and the clarity of the description, a slot may be referred as a data block with a predefined length. The data block may include power control information.

In embodiments of the invention, baseband processor 110 may provide a signal for transmission to step attenuator 120. In some embodiments of the present invention, the signal for transmission may include an in-phase signal component (I) and a quadrature signal component (Q), if desired. Step attenuator 120 may or may not attenuate the signal for transmission and may provide an input signal 125 to transmitter 200. In some embodiments of the invention, input signal 125 may include I and Q signal components that may be inputted to mixer 210. Mixer 210 may mix and/or modulate the I and Q components of input signal 125 with an RF signal. Combiner 220 may combine the modulated I and Q components into a combined RF signal for transmission, VVA 230 may set the amplitude of the combined RF signal, and VGA 240 may amplify the combined RF signal to satisfy a desired input level to power amplifier 300. Power amplifier 300 may transmit the RF signal by antenna 310.

Although the scope of the present invention is not limited in this respect, in other embodiments of the present invention, controllable circuitry, for example, VVA 230 and VGA 240 may be combined in one component, if desired. Additionally or alternatively, in embodiments of the present invention, the alignment of a gain and an amplitude of the RF signal for transmission may be done by other components such as, for example, a power amplifier, if desired.

Although the scope of the present invention is not limited in this respect, a portion of the transmitted signal may be input to feedback path 250. For example, step attenuator 260 may attenuate the amplitude of a portion of the transmitted signal and amplifier 270 may amplify and/or buffer the attenuated potion of the transmitted signal. In addition, detector 280 may detect the power of the portion of the transmitted signal and filter 290, for example, a low pass filter, may filter noise from the portion of the transmitted signal and may provide a feedback signal 255 to power control module 130.

Although the scope of the present invention is not limited in this respect, control module 130 may be a processor, a cellular baseband controller, a digital signal processor and the like.

Although the scope of the present invention is not limited in this respect, control module 130 may sample feedback signal 255 and may store the sample in memory 140, if desired. Although the scope of the present invention is not limited in this respect, memory 140 may be a register, a buffer, a random access memory (RAM), a static RAM, a dynamic RAM, a FLASH memory, or the like.

Although the scope of the present invention is not limited in this respect, the first sample of feedback signal 255 may be used as a reference value and/or as a targeted power level, if desired. Control power module 130 may control the transmitted signal power level, e.g., by comparing the reference value and/or a target power level to the power level of feedback signal 255. Furthermore, control power module 130 may provide a control signal 135 to vary and/or set the gain of at least one of attenuator 120, VVA 230, VGA 240, although the scope of the present invention is not limited in this respect.

Although the scope of the present invention is not limited in this respect, in alternative embodiments of the present invention, feedback path 250 may include an analog feedback path and may provide an analog feedback signal to power control module 130. Additionally or alternatively, feedback path 250 may include a down converter (not shown) and/or demodulator (not shown) to provide a baseband signal as the feedback signal, although the scope of the present invention is not limited in this respect.

Figure 3:
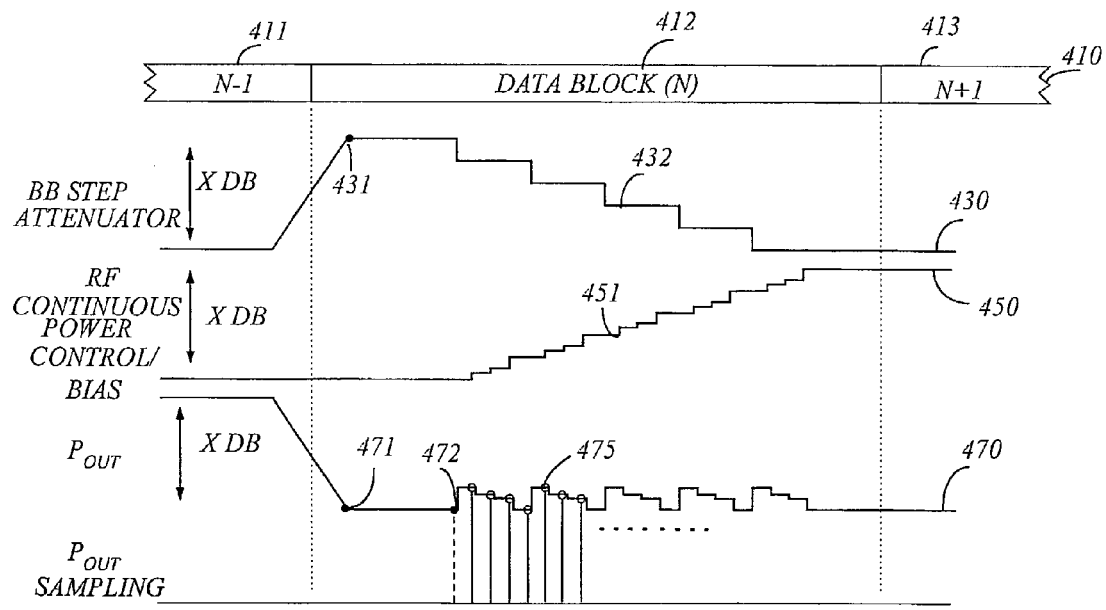
FIG. 3 is a schematic illustration of received data blocks and time diagrams of transmitter signals that may be helpful in understanding the operation of an exemplary embodiment of the present invention.
Figure 2:
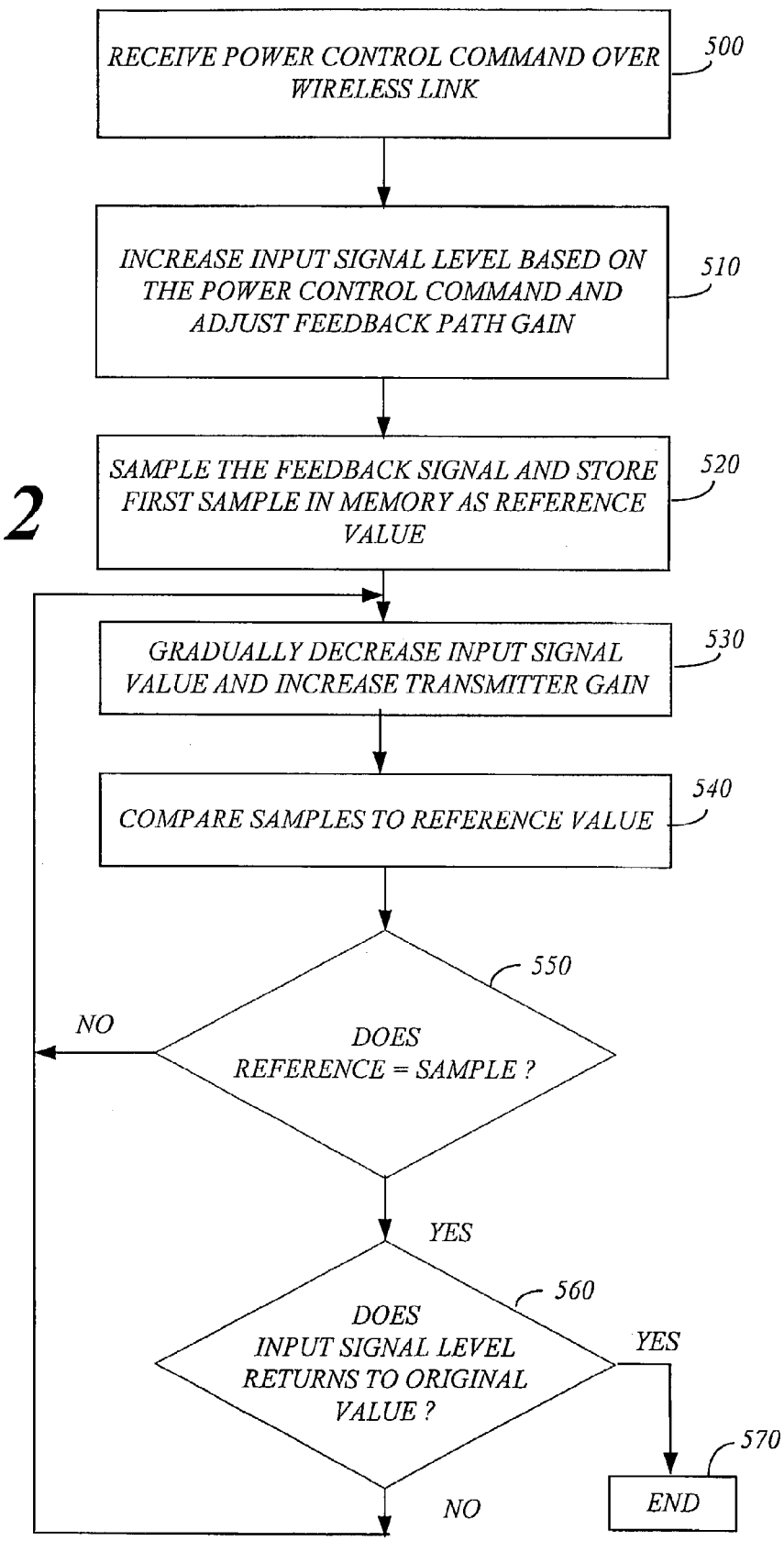
FIG. 2 is a flowchart of a power control method according to exemplary embodiments of the present invention.

Turning to FIGS. 2 and 3. FIG. 2 illustrates an example of a method of power control that may be used in conjunction with embodiments of the present invention, and FIG. 3 is a schematic illustration of received data blocks and signal diagrams of transmitter 1000 that may be helpful in understanding the power control method in accordance with embodiments of the invention. Although the scope of the present invention is not limited in this respect, FIG. 3 shows data blocks 410 of received signal 315, a time diagram 430 of input signal 125, a time diagram 450 of power control signal 135, and a time diagram 470 of feedback signal 255.

Although the scope of the present invention is not limited in this respect, the method of power control may adaptively learn a gain transfer function of transmitter 200. For example, the gain transfer function may include the following function:

$$G = A_1 \times V_{CONTROL} + A_2 \times V_{CONTROL}^2 + A_3 \times V_{CONTROL}^3$$

wherein:

"G" may be the gain of transmitter 200;

$V_{CONTROL}$ may be the power control voltage; and

A1, A2, A3 may be coefficients of the polynomial.

Accordingly, coefficients A1, A2 and A3 may be stored in memory 140 and adaptively learning the gain transfer function may include varying $V_{CONTROL}$ until "G" may reach a desired value. Furthermore, the value of $V_{CONTROL}$ may be determined by repeatedly sampling the feedback signal and comparing a first sample to additional samples.

Although the scope of the present invention is not limited in this respect, the method may begin with receiving over a wireless link data blocks 410 that may include a power control command (block 500). For example, a slot 411 may include a command to increase the power of the transmitted signal by a predetermined value, for example +1 dB. During the reception period of a data block 412 (shown with dotted lines), power control module 130 may set attenuator 120 to +1 dB (FIG. 3, numerical reference 431) and may adjust the gain of the feedback path 250 by adjusting the gain of attenuator 270. Thus, feedback signal 255 may be adjusted to a required level within a predefined dynamic range.

Although the scope of the present invention is not limited in this respect, in alternative embodiments of the present invention, feedback path 250 may be adjusted before adjusting the gain of attenuator 270 or, in some embodiments of the present invention, after the input signal may return to its original value, as shown at block 560. However, the setting of attenuator 120 to, e.g., +1 dB may cause a degradation in feedback signal 255 (FIG. 3, numerical reference 471). Thus, in this example, an increase in the level of input signal 125 may be compensated by adjusting the level of feedback signal 255, as indicated at block 510. Furthermore, power control module 130 may sample feedback signal 255 and may store a first sample 472 in memory 140 as a reference value (block 520).

Although the scope of the present invention is not limited in this respect, attenuator 120 may be set to −1 dB or other to other levels based on the command received by data block 412, if desired. Feedback path 250 may be adjusted (by attenuator 270) to control the output power level of transmitter 200 and power amplifier 300 to be at the target power level set by attenuator 120.

Although the scope of the present invention is not limited in this respect, power control module 130 may gradually increase the gain of transmitter 200 and decrease the value of input signal 125 (block 530). Power control module 130 may increase the gain of transmitter 200 by varying the level of control signal 135, as shown by numeral reference 451 in FIG. 3. Furthermore, control signal 135 may be provided to at least one of controllable circuitry, for example, VVA 230, VVG 240 and/or PA 300, if desired. Additionally or alternatively, power control module 130 may decrease the level of input signal 125 by stepping down attenuator 120 to its original value, as shown by numeral reference 432 in FIG. 3.

Although the scope of the present invention is not limited in this respect, the original value of attenuator 120 may be for example, 0 dB. The original gain of attenuator 120 may be substantially equivalent to the gain of attenuator 120 at the previous data block (data block 411).

Although the scope of the present invention is not limited in this respect, power control module 130 may repeatedly sample feedback signal 255 and may compare the sampled values (475) to a reference value (472), as indicated at block 540. If reference value 472 is substantially equal to the sampled value (block 550) and the input signal is not in its original value (block 560), the method, during the reception of data block 412, may continue to gradually decrease the input signal level and to increase the gain of transmitter 200. For example, attenuator 120 may be stepped down to 0 dB. The method may end (block 570) when the input signal level returns to its original value and/or when reference sample 472 is substantially equal to sample 475.

While certain features of the invention have been illustrated and described herein, many modifications, substitutions, changes, and equivalents will now occur to those skilled in the art. It is, therefore, to be understood that the appended claims are intended to cover all such modifications, substitutions, changes and equivalents as may fall within the true spirit of the invention.

What is claimed is:

1. A method comprising:
at a time slot of receiving a data block which includes power control information, controlling a power level of a transmitted signal based on the power control information received with the data block by varying an input signal level and a gain of the transmitted signal, wherein varying the input signal level includes:
sampling a feedback signal of the transmitted signal;
storing a first sample of the feedback signal;
comparing the first sample to other samples of the feedback signal;
advancing the level of the input signal toward its initial level when the first sample is substantially equal to one of the other samples; and generating a control signal based on the results of the comparing.

2. The method of claim 1, wherein controlling a power level comprises:
adaptively learning a gain transfer function by varying a control power voltage of a transmitter that transmits the transmitted signal.

3. The method of claim 2, wherein adaptively learning comprises:
sampling a feedback signal of the transmitted signal; and
adjusting the input level of the input signal to its initial level according to samples of the feedback signal.

4. The method of claim 1, wherein controlling the power level of the transmitted signal comprises:
setting the input signal level to a predetermined level;
adjusting the gain of a transmitter that transmits the transmitted signal; and
advancing the level of the input signal toward its initial level.

5. The method of claim 1, wherein varying the gain of the transmitted signal comprises attenuating a power of a modulated transmitted signal.

6. An apparatus comprising:
a step attenuator to set at a time slot of receiving a data block a level of an input signal of a transmitted signal based on a target power value provided by the data block;
a transmitter to transmit a signal at the target power value; and
a power control module to advance the level of the input signal to its initial level based on a feedback signal, to provide a control signal to adjust a gain of the transmitter and to adaptively learn a gain transfer function of the transmitter by applying to the control signal prestored coefficients of the gain transfer function.

7. The apparatus of claim 6, further comprising:
a feedback loop to provide the feedback signal to the power control module; and
a memory to store a first sample of the feedback signal.

8. The apparatus of claim 6, wherein the control module comprises a processor.

9. The apparatus of claim 6, wherein the transmitter comprises controllable circuitry and the power control module is able to adjust the power of the transmitter by providing the control signal to the controllable circuitry.

10. An apparatus comprising:
a dipole antenna to receive a data block;
a step attenuator to set at a time slot of receiving a data block a level of an input signal of a transmitted signal based on a target power value provided by the data block;
a transmitter to transmit a signal at the target power value; and
a power control module to advance the level of the input signal to its initial level based on a feedback signal, to provide a control signal to adjust a gain of the transmitter and to adaptively learn a gain transfer function of the transmitter by applying to the control signal prestored coefficients the gain transfer function.

11. The apparatus of claim 10, further comprising:
a feedback loop to provide the feedback signal to the power control module; and
a memory to store a first sample of the feedback signal.

12. The apparatus of claim 10, wherein the control module is able to generate a control signal based on the results of comparing the first sample to the other samples.

13. The apparatus of claim 10, wherein the control module comprises a processor.

14. The apparatus of claim 10, wherein the transmitter comprises controllable circuitry and the power control module is able to adjust the power of the transmitter by providing the control signal to the controllable circuitry.

15. An article comprising: a storage medium having stored thereon instructions that when executed result in:
at a time slot of receiving a data block which includes power control information, controlling a power level of a transmitted signal based on the power control information received with the data block by varying an input signal level and a gain of the transmitted signal wherein varying the input signal level includes:
sampling a feedback signal of the transmitted signal;
storing a first sample of the feedback signal;
comparing the first sample to other samples of the feedback signal;
advancing the level of the input signal toward to its initial level when the first sample is substantially equal to one of the other samples; and generating a control signal based on the results of the comparing.

16. The article of claim 15 wherein, the instructions when executed further result in: adaptively learning a gain transfer function by varying a control power voltage of a transmitter that transmits the transmitted signal.

17. The article of claim 15 wherein, the instructions when executed further result in:
sampling a feedback signal of the transmitted signal; and
adjusting the input level of the input signal to its initial level according to samples of the feedback signal.

18. The article of claim 15 wherein, the instructions when executed further result in:

setting the input signal level to a predetermined level;
adjusting the gain of a transmitter that transmits the transmitted signal; and
advancing the level of the input signal toward its initial level.

19. The article of claim 15 wherein, the instructions when executed further result in:
attenuating a power of a modulated transmitted signal.

* * * * *